M. LISICWICZ.
DEMOUNTABLE MECHANICALLY RESILIENT TIRE.
APPLICATION FILED JAN. 5, 1917.
1,263,907.
Patented Apr. 23, 1918.
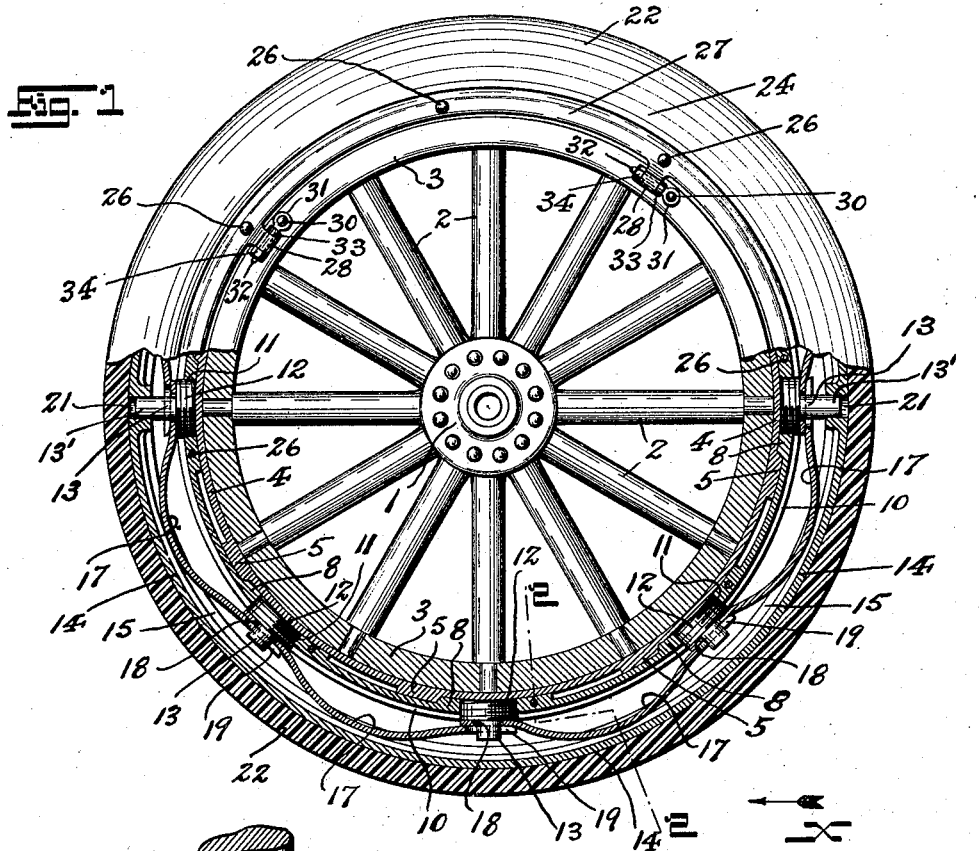
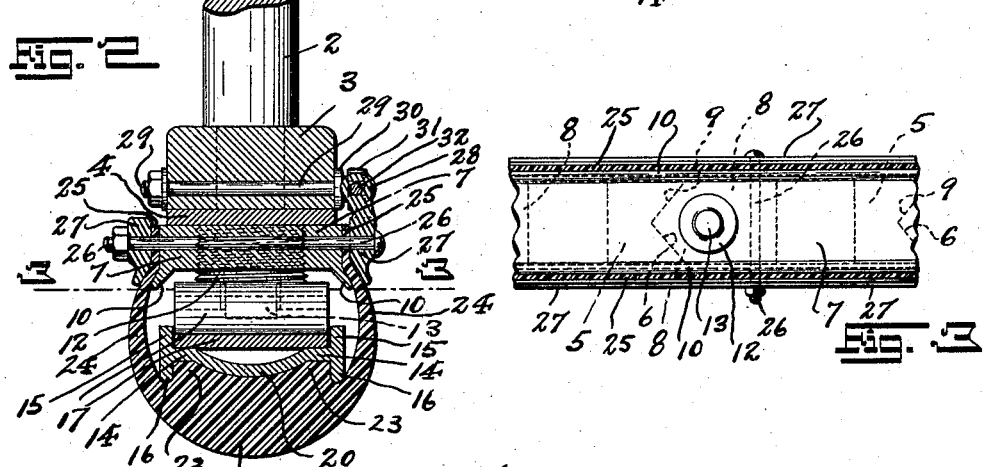
WITNESSES:
INVENTOR
Martin Lisicwicz,
BY
ATTORNEYS

UNITED STATES PATENT OFFICE.

MARTIN LISICWICZ, OF NEWARK, NEW JERSEY.

DEMOUNTABLE MECHANICALLY-RESILIENT TIRE.

1,263,907.

Specification of Letters Patent. Patented Apr. 23, 1918.

Application filed January 5, 1917. Serial No. 140,665.

*To all whom it may concern:*

Be it known that I, MARTIN LISICWICZ, a citizen of the United States, residing at Newark, in the county of Essex and State of New Jersey, have invented certain new and useful Improvements in Demountable Mechanically - Resilient Tires; and I do hereby declare the following to be a full, clear, and exact description of the invention, such as will enable others skilled in the art to which it appertains to make and use the same, reference being had to the accompanying drawings, and to characters of refernce marked thereon, which form a part of this specification.

The present invention relates to improvements in tires for vehicles; and the invention has reference, more particularly, to a novel construction of resilient mechanism adapted to be inclosed in an outer shoe of rubber, or other similar material, and which is designed to take the place of the inner tube of a pneumatic tire, so as to provide an easy riding shock-absorbing tire, having the appearance of the ordinary pneumatic tire commonly used, yet not being readily liable to deflation by punctures as are such pneumatic tires.

The invention, therefore, has for its principal object to provide a mechanically resilient tire construction; and the invention has for a further object the provision of a mechanically resilient tire construction embodying features of construction which renders the same readily demountable from the felly and rim of the wheel.

Other objects of the present invention, not at this time more particularly enumerated, will be clearly understood from the following detail description of the same.

With the various objects of my present invention in view, the same consists, primarily, in the novel construction of demountable mechanically resilient tire for automobiles and other vehicles hereinafter set forth; and the invention consists, furthermore, in the novel arrangements and combinations of the several devices and parts, as well as in the details of the construction of the same, all of which will be more fully described in the following specification, and then finally embodied in the claims appended thereto.

The invention is clearly illustrated in the accompanying drawings, in which:—

Figure 1 is a side elevation of a vehicle wheel equipped with my novel construction of demountable mechanically resilient tire; a portion of the wheel felly and tire structure being shown in vertical section, to illustrate the inner construction thereof.

Fig. 2 is a detail transverse section, drawn on an enlarged scale, said section being taken on line 2—2 in said Fig. 1, looking in the direction of the arrow x.

Fig. 3 is a horizontal section taken on line 3—3 in said Fig. 2, looking upward, the spring elements being removed, and said view being drawn on a reduced scale.

Fig. 4 is a detail plan view of one of the spring elements used in the interior structure of the tire.

Similar characters of reference are employed in all of the hereinabove described views, to indicate corresponding parts.

Referring now to the said drawings, the reference character 1 indicates the hub of the vehicle wheel, from which radiate the usual spokes 2, which terminate in the felly 3. Secured upon said felly 3 in any suitable manner, preferably by shrinking on the same, is a fixed metallic rim member 4. Projecting from the exterior surface of said rim member 4, and spaced at regular intervals around the circumference thereof, are bosses or projections 5, each having, at one end, a female portion or receiving socket 6.

The reference character 7 indicates a demountable rim. Projecting from the surface of said demountable rim 7, and spaced at regular intervals around its inner circumference, are bosses or projections 8, each having, at one end, a male portion or tongue 9. Integrally formed in connection with the outer side marginal edges of said demountable rim 7 are outwardly inclined annular seating flanges 10, the purposes of which will presently appear.

Provided in said demountable rim 7, and preferably formed in that portion thereof where the body of the rim is thickened by the bosses or projections 8, are internally threaded openings 11. Secured into each opening 11 is an exteriorly threaded shank-portion 12, from the free end of which projects an anchor-stud 13 of reduced diameter.

The reference character 14 indicates a shoe-supporting ring, which is spaced concentrically away from said demountable rim 7. Said shoe-supporting ring 14 is provided at its marginal edges with vertical flange portions, the inwardly extending portion 15 of each flange extending beyond the interior side of said ring 14, and the outwardly extending portion 16 of each flange extending beyond the exterior side of said ring 14.

Arranged within the annular space intervening between the said demountable rim 7 and said shoe-supporting ring 14 are a series of arcuate spring-members 17. One end of each spring-member 17 is provided with an eye 18, and the opposite end thereof with a bifurcated portion providing a longitudinal slot 19. Said spring-members 17 are secured in operative positions relative to the said demountable rim 7 and said shoe-supporting ring 14 by engaging the eyes 18 thereof over the anchor-studs 13, and then engaging the slotted ends thereof over the next adjacent anchor-stud 13, so that said slotted end overlaps the anchored end of the spring-member which is secured by its eye 18 over said next adjacent anchor-stud 13. As thus disposed said spring-members extend from anchor-stud to anchor-stud, and arch outwardly so that their main body portions contact or engage tangentially the surface of said shoe-supporting ring 14. The contacting portion of each spring-member, as it thus engages said shoe-supporting ring, is disposed between said inwardly extending portions 15 of the vertical flanges of the latter, and are held thereby against undue lateral play, or displacement from such proper relation to said shoe-supporting ring 14. If desired, said shoe-supporting ring 14 may be transversely bowed, as at 20, to reduce the frictional contact of said spring members 17 therewith. In order to prevent "creeping" of said shoe-supporting ring 14 around the wheel, the same is provided with a pair of receiving sockets 21, diametrically opposite each other, and a pair of diametrically opposed anchor-studs 13 are elongated, to provide extension portions 13' receivable in said receiving-sockets 21, thus serving to retain said shoe-supporting ring against longitudinal or circumferential movement.

The reference character 22 indicates a tire-tread or outer shoe, the inner surface of which is preferably formed to provide a rib 23 receivable between the outwardly extending portions 16 of the vertical flanges of said shoe-supporting ring 14, thus holding said shoe 22 against lateral displacement. The side-portions 24 of said shoe 22 extend inwardly on each side of the annular space between the demountable rim 7 and said shoe-supporting ring 14, and thus inclose the spring-members 17. The marginal edges 25 of said side-portions 24 are registered over said annular seating flanges 10 of said demountable rim 7. The body of said demountable rim is pierced transversely, at suitable intervals, for the passage of retaining bolts 26. Exterior clamp-rings 27 are overlaid upon the said marginal edges 25 of said shoe 22, the same also being pierced for the passage of said bolts 26, which also pass through said marginal edges 25 of the shoe 22, so that when the same are fastened, they serve to clamp the marginal edges of the shoe between said seating flanges 10 and said clamp-rings 27, and thus hold the shoe in place.

The shoe and the interior mechanism of the tire may all be assembled and properly mounted upon the demountable rim 7, while the latter is removed from the wheel. Hence, an extra or spare tire, embodying my novel construction, may be carried all ready to be applied to the wheel, in case the tire affixed thereto gets out of order, or is accidentally damaged. When it is desired to place a tire on the wheel, the bosses 8 of the demountable rim 7 are registered with the spaces between the bosses 5 of the fixed rim member 4 of the wheel, and then the demountable rim 7 is pushed transversely over said fixed rim-member 4. After being thus positioned, the demountable rim 7 is moved longitudinally or circumferentially upon said fixed rim-member 4, to carry the male portions or tongues 9 of the bosses 8 into interlocking relation with the female portions or receiving sockets 6 of the bosses 5, thus locking the demountable rim 7 against lateral displacement from the fixed rim-member 4. In order to hold the parts in such interlocked relation, one of said clamp-rings 27 is provided with one or more inwardly extending perforated ears 28, which extend inwardly over one side of the felly 3 of the wheel. Secured to said felly 3 by its bolt-portion 29 is a pivot-member 30, upon which is pivoted by its ear 31 a screw-threaded shank 32 having a shoulder 33 at its inner end. This shank 32 is passed through said perforate ear 28, until the latter abuts against the shoulder 33, and then a lock-nut 34 is screwed upon the free end of said shank, which projects from the opposite side of said perforate-ear 28, thus anchoring said ear 28 to the felly 3, and thereby holding said clamp-ring and demountable-rim 7 to which it is bolted against any retractive circumferential movement tending to unseat said mutually engaged bosses 5 and 8.

It will readily be understood, from the above description, that the present invention provides a very simply constructed, yet highly efficient mechanical tire, the arcuate spring-members of which absorb the shocks of traction. The shoe 22 giving the tire the appearance of the ordinary pneumatic tire, and the demountable rim construction provides all the convenient features inherent in the ready to use tire.

I am aware that some changes may be made in the several arrangements and combinations of the various devices and parts of my present invention, as well as in the details of the construction of the same, without departing from the scope of my invention as defined in the appended claim. Hence, I do not limit my invention to the exact arrangements and combinations of the various parts as described in the foregoing specification, nor do I confine myself to the exact details of the construction of said parts as shown in the accompanying drawings.

I claim.

The combination with the felly of a wheel of a fixed rim-member, a demountable rim, means respectively on said fixed rim-member and said demountable rim adapted when mutually engaged to prevent lateral displacement of the latter from the former, a detachable annular member at one side of said demountable rim, fastening bolts extending through said demountable rim and said annular member, an inwardly extending perforate ear integrally connected with said annular member and adapted to extend over the outer side of said felly, a bolt pivoted to the outer side of said felly so as to swing in a plane parallel to the face of the wheel, a shoulder on said bolt adjacent its pivoted end, said perforate ear being adapted to slip over the free end of said bolt so as to abut against said shoulder, and a nut engaged on said bolt on the opposite side of said perforate ear.

In testimony that I claim the invention set forth above I have hereunto set my hand this 30th day of December, 1916.

MARTIN LISICWICZ.

Witnesses:
GEORGE D. RICHARDS,
FRED'K H. W. FRAENTZEL.